United States Patent [19]

Kondo et al.

[11] Patent Number: 4,562,238

[45] Date of Patent: Dec. 31, 1985

[54] ROOM TEMPERATURE CURABLE SILICONE RUBBER COMPOSITION

[75] Inventors: Kiyohiro Kondo; Hiroshi Sugawara; Nobuyuki Hasebe, all of Gunma, Japan

[73] Assignee: Shin-Etsu Chemical Co., Ltd., Tokyo, Japan

[21] Appl. No.: 621,441

[22] Filed: Jun. 18, 1984

[51] Int. Cl.$^4$ ............................................. C08G 77/06
[52] U.S. Cl. ....................................... 528/18; 528/33; 528/34; 524/860
[58] Field of Search ........................... 528/18, 33, 34; 524/860

[56] References Cited

U.S. PATENT DOCUMENTS 3,661,887  5/1972  Leebrick ............................... 528/18
3,664,997  5/1972  Chadha et al. ........................ 528/18

*Primary Examiner*—Melvyn I. Marquis
*Attorney, Agent, or Firm*—Toren, McGeady, Stanger, Goldberg & Kiel

[57] ABSTRACT

The invention provides an improvement of a room temperature-curable silicone rubber composition cured by the mechanism of the condensation reaction between terminal silanolic hydroxy groups of a diorganopolysiloxane and an organosilicon compound having at least three alkoxy groups per molecule in the presence of an organotin compound as a catalyst to form crosslinks in respect of the remarkably small permanent compression set as well as excellent heat resistance of the cured rubbery elastomer thereof. Different from conventional compositions of the above mentioned type containing some organotin compound as the curing catalyst, the inventive composition preferably contains very specific organotin compound as the curing catalyst, which is represented by the general formula $R_2R^1Sn\text{-}O\text{-}SnR^1R_2$ or $R_2SnR_2^1$, in which R is a monovalent hydrocarbon group and $R^1$ is an acid residue of a monoalkyl ester of a dibasic carboxylic acid such as MeOCOCH=CHCOO— and the like, in a limited amount. The composition may further contain an inorganic filler, of which the neutral surface condition is important in order that the composition may have good curability to give a cured rubbery elastomer exhibiting a small permanent compression set. A limited content of silicon-bonded vinyl group in the diorganopolysiloxane, the balance being methyl groups, is effective to improve the heat resistance of the cured rubber.

5 Claims, No Drawings

ROOM TEMPERATURE CURABLE SILICONE RUBBER COMPOSITION

BACKGROUND OF THE INVENTION

The present invention relates to a room temperature curable silicone rubber composition or, more particularly, to a room temperature curable organopolysiloxane rubber composition with good curability capable of giving a cured rubbery elastomer having an outstandingly good heat resistance and small permanent compression set.

There are known several types of room temperature curable silicone rubber compositions curable with different mechanisms of crosslink formation, of which the most widely used one is the composition curable by the condensation reaction between silanolic hydroxy groups at both of the molecular chain ends of a diorganopolysiloxane and alkoxy groups in an organosilane or organopolysiloxane compound having at least three of such alkoxy groups in a molecule in the presence of a curing catalyst. Conventional catalysts effective to such a condensation reaction are organotin compounds such as dibutyltin dilaurate and dibutyltin dioctoate.

A problem in these room temperature curable silicone rubber compositions is the poor mechanical properties of the cured rubbery elastomers thereof, in particular, in respect of the permanent compression set. That is, when a cured rubbery elastomer body was kept under compressive force for a long time, the initial uncompressed form of the elastomer body can be regained only partly even by the release of the outer compressive force and the permanent compression set, i.e. the percentage of the unregained compression of the elastomer body, is remarkably larger in the cured elastomer body of the room temperature-curable silicone rubber compositions than of the heat-curable silicone rubber compositions. Such a disadvantageous property of the compositions greatly limits the applicability of the composition to practical uses. For example, gaskets made of such a room temperature-curable silicone rubber composition are not free from the decrease in the packing effect when the gasket is used for a long period of time under compression. When a rubber roller of such a room temperature-curable silicone rubber on a core mandrel of metal is run after a long period of time under a contacting pressure with another roller, the silicone rubber roller has been deformed and the cross section thereof is no longer exactly circular so that the revolution of the roller is accompanied by the generation of noises or the design pressure cannot be obtained at the deformed portion. Such a problem in the rubber roller formed of a room temperature-curable silicone rubber can be overcome only by the use of an elaborate mechanical means with which the rubber portion of the roller is not under compression when the roller is not in running.

Owing to the above described disadvantageous property of the large permanent compression set, room temperature-curable silicone rubber compositions are excluded from the industrial applications in which the rubber parts are under continuous compression prolongedly despite the advantageous properties in comparison with heat-curable silicone rubbers in respect of the workability, adhesiveness to the substrate surface and mold-releasability as well as the short half-life for the decay of the static electricity accumulated thereon. Therefore, one of the most important problems for investigations in the technology of room temperature-curable silicone rubber compositions has been the improvement in respect of the permanent compression set.

Various attempts and proposals have of course been made in this regard. For example, decrease in the amount of the organotin compound as the curing catalyst is effective to some extent though with a great sacrifice in the curing velocity so that such a silicone rubber composition requiring an unduly long curing time is industrially no longer practical even by the extended pot life. The use of tin (II) octoate as the curing catalyst in place of the above named organotin compounds is indeed effective to decrease the permanent compression set but the catalytic activity of this compound is very large and too sensitive to the amount of formulation so that difficulties are encountered in obtaining an accurate and reproducible formulation of the composition if not to mention the disadvantages for the industrial application due to the remarkably decreased pot life of the catalyst-blended composition and the inherent instability of this compound against humidity. Another problem in the room temperature-curable silicone rubber composition crosslinkable by the condensation reaction is the relatively low heat resistance of the cured rubbery elastomer in comparison with those curable by the addition reaction between vinyl groups bonded to the silicon atoms and the hydrogen atoms directly bonded to the silicon atoms in the presence of a platinum catalyst. For example, the hardness of the cured rubber of the condensation-type room temperature-curable silicone rubber composition may be greatly decreased when the rubber is heated at 200° C. or above or kept in a hermetically sealed condition at 150° C. or above. Further, the reliability of curing is somewhat low in the condensation-type room temperature-curable silicone rubber compositions when a rubber article of a large wall thickness is desired resulting in a considerably large difference between the values of hardness at the surface layer and in the depth of the thick wall.

SUMMARY OF THE INVENTION

An object of the present invention is therefore to provide a novel and improved room temperature-curable silicone rubber composition free from the above described problems in the prior art compositions of the similar type or, in particular, a room temperature-curable silicone rubber composition capable of giving a cured rubbery elastomer exhibiting a remarkably decreased permanent compression set.

Another object of the invention is to provide a room temperature-curable silicone rubber composition curable by the mechanism of condensation reaction with good and reliable curability even when the wall thickness of the rubber article is large and capable of giving a cured rubbery elastomer having excellent heat resistance.

Thus, the room temperature-curable silicone rubber composition provided by the present invention comprises:

(a) 100 parts by weight of a diorganopolysiloxane of a substantially linear molecular structure terminated at both molecular chain ends each with a hydroxy group directly bonded to the terminal silicon atom and having a viscosity in the range from 500 to 1,000,000 centistokes at 25° C.;

(b) from 1 to 30 parts by weight of an organosilane or organopolysiloxane having at least three alkoxy groups in a molecule, which serves as a crosslinking agent;

(c) up to 300 parts by weight of an inorganic filler; and (d) an organotin compound which in a preferred embodiment is, when improvement in respect of the permanent compression set is desired, in particular, a compound represented by the general formula

$$R_2R^1Sn-O-SnR^1R_2 \qquad (I)$$

or

$$R_2SnR^1{}_2, \qquad (II)$$

in which R is a monovalent hydrocarbon group and $R^1$ is an acid residue of a dibasic carboxylic acid monohydrocarbyl ester, in an amount from 0.01 to 5.0% by weight based on the total amount of the components (a), (b) and (c).

When good curability and excellent heat resistance of the cured rubbery elastomer are desired of the room temperature-curable silicone rubber composition of the above described type, it is preferable that the diorganopolysiloxane as the component (a) contains from 0.01 to 0.10 mole of vinyl groups bonded to the silicon atoms per 100 g as a part of the organic groups, the balance being methyl groups.

DETAILED DESCRIPTION OF THE PREFERRED EMBODIMENTS

The above described formulation of the inventive room temperature-curable silicone rubber composition has been established as a result of the extensive investigations continued by the inventors concentrated to the problems of the types of the organic groups in the hydroxy-terminated diorganopolysiloxane and the organotin compound as the curing catalyst and is indeed very effective in decreasing the permanent compression set and increasing the heat resistance of the cured rubbery elastomer obtained from the silicone rubber composition as well as improving the curability of the composition.

The component (a), which is the base component of the inventive room temperature-curable silicone rubber composition, is a diorganopolysiloxane of a substantially linear molecular structure terminated at both molecular chain ends each with a hydroxy group directly bonded to the terminal silicon atom. Such a diorganopolysiloxane is conventionally used in the prior art room temperature-curable organopolysiloxane compositions so that detailed description thereof need not be given here. The diorganopolysiloxane should preferably have a viscosity in the range from 500 to 1,000,000 centistokes at 25° C.

The organic groups bonded to the silicon atoms in this diorganopolysiloxane are selected from the class consisting of alkyl groups such as methyl, ethyl and propyl groups, cycloalkyl groups such as cyclohexyl and cycloheptyl groups, alkenyl groups such as vinyl and allyl groups, aryl groups such as phenyl group and aralkyl groups such as benzyl, 2-phenylethyl and 3-phenylpropyl groups. It is preferable that at least 50% in number of the organic groups bonded to the silicon atoms are methyl groups.

When the particularly desired effects to be obtained with the inventive compositions are the improvements in the curability of the composition in the depth of a thick layer and the heat resistance of the cured rubbery elastomer of the composition, it is preferable that 100 g of the diorganopolysiloxane as the component (a) contain from 0.01 to 0.10 moles of vinyl groups, the balance of the organic groups bonded to the silicon atoms being methyl groups. It should be noted that substantially the same effect of the silicon-bonded vinyl groups may be obtained even when the component (a) is a combination of a hydroxy-terminated dimethylpolysiloxane having no vinyl groups and a hydroxy-terminated vinyl-containing dimethylpolysiloxane in which the content of the vinyl groups is larger than 0.10 mole/100 g provided that the overall content of the vinyl groups in the mixture of the two is within the above specified range.

The component (b), which serves as a crosslinking agent of the hydroxy-terminated diorganopolysiloxane as the component (a), is an organosilicon compound, e.g. organosilane or organopolysiloxane compound, having at least three alkoxy groups bonded to the silicon atom or atoms in a molecule. This type of organosilicon compounds and the performance thereof as a crosslinking agent in a room temperature-curable silicone rubber composition are well known in the art of silicones so that detailed description thereof need not be given here. When the component (b) is an organosilane compound, it may be a trialkoxy monohydrocarbylsilane or a tetraalkoxysilane and the alkoxy groups in these silane compounds are selected preferably from the class consisting of methoxy, ethoxy and iso- or n-porpoxy groups while the hydrocarbyl group, which may be unsubstituted or substituted, in the former type of the silane compounds may be selected from the class consisting of methyl, ethyl, phenyl and vinyl groups as well as those substituted hydrocarbon groups such as 3-glycidyloxypropyl, 3-acryloxypropyl, 3-aminopropyl, 3-(N-2-aminoethyl)aminopropyl and 2-mercaptoethyl groups though not particularly limited thereto.

Particular examples of suitable silane compounds as the component (b) include, for example, methyl trimethoxysilane, methyl triethoxysilane, phenyl trimethoxysilane, phenyl triethoxysilane, vinyl trimethoxysilane, vinyl triethoxysilane, tetraethoxysilane, tetra(isopropoxy)silane and the like.

A problem in the use of some of the above named organosilane compounds as the component (b) is that these silane compounds have a relatively low boiling point or relatively high volatility so that curing of the inventive room temperature-curable silicone rubber composition is sometimes incomplete in the surface layer, especially, when the composition to be cured is in the form of a thin layer. A recommendable way in such a case is the use of an organopolysiloxane of a relatively low molecular weight having at least three alkoxy groups in a molecule. Such an organopolysiloxane compound, usually, in a liquid form can readily be prepared by the partial hydrolysis and condensation of the above named tri- or tetraalkoxysilanes either singly or as a combination of two kinds or more according to need.

The component (c), which is an optional component admixed in the inventive composition according to need, is an inorganic filler such as powdered quartz, diatomaceous earth, titanium dioxide, iron oxide, calcium carbonate, fumed silica, precipitated silica and the like of which siliceous fillers are preferred. These inorganic fillers are conventional in room temperature-curable silicone rubber compositions. It should be noted, however, in the present invention that the inorganic filler should not be excessively acidic or alkaline since no satisfactory improvements can be obtained in the permanent compression set of the cured rubbery elastomer of the composition or curing of the composition may be incomplete when the composition is formulated with such a strongly acidic or alkaline inorganic filler. In this regard, the inorganic filler should preferably be neutral in such an extent that the aqueous suspension thereof may have a value of pH in the range from 3 to 10.

The component (d), which serves as a curing catalyst in the inventive room temperature-curable silicone rubber composition, may be an organotin compound exemplified, for example, by carboxylic acid salts of tin such as tin octoate, tin laurate, tin naphthenate and the like and salts of carboxylic acids, e.g. 2-ethylhexoic acid, acetic acid, lauric acid and maleic acid, with monobutyltin, dibutyltin, monomethyltin, dimethyltin, monooctyltin, dioctyltin, trioctyltin and the like organotin groups.

In a preferred embodiment, when the particularly desired effect to be obtained with the inventive composition is the improvement in the permanent compression set of the cured rubbery elastomer thereof, a very specific organotin compound should be used preferably rather than the above named conventional organotin compounds. The organotin compound is represented by the general formula $R_2R^1Sn-O-SnR^1R_2$ or $R_2SnR^1{}_2$, in which R is a monovalent hydrocarbon group selected from the class consisting of alkyl groups such as methyl, ethyl, propyl, butyl and octyl groups, alkenyl groups such as vinyl and allyl groups, aryl groups such as phenyl group and aralkyl groups such as benzyl, 2-phenylethyl and 3-phenylpropyl groups and $R^1$ is an acid residue of a monoalkyl ester of a dibasic carboxylic acid as described below.

That is, the dibasic carboxylic acid, from a monoalkyl ester of which the group $R^1$ is derived, may be an aromatic dibasic carboxylic acid such as phthalic and isophthalic acids, aliphatic unsaturated dibasic carboxylic acid such as maleic and fumaric acids or aliphatic saturated dibasic carboxylic acid such as oxalic, malonic and succinic acids and the alkyl group to form the monoalkyl ester with the dibasic acid may be methyl, ethyl, isopropyl, n-butyl, hexyl and octyl groups.

Several of the particular examples of the organotin compound in conformity with the above given definition include, denoting methyl, ethyl, isopropyl, n-butyl, hexyl, octyl and benzyl groups with the symbols of Me, Et, Pr, Bu, Hx, Ot and Bz, respectively: bis(methoxymaleoyloxy dibutyltin) oxide of the formula (MeOCOCH=CHCOO)Bu$_2$Sn—O—SnBu$_2$(OCOCH=CHCOOMe); bis(ethoxymaleoyloxy dibutyltin) oxide of the formula (EtOCOCH=CHCOO)Bu$_2$Sn—O—SnBu$_2$(OCOCH=CHCOOEt); bis(isopropoxymaleoyloxy dibutyltin) oxide of the formula (PrOCOCH=CHCOO)Bu$_2$Sn—O—SnBu$_2$(OCOCH=CHCOOPr); dibutyltin di(hexylmaleate) of the formula Bu$_2$Sn(OCOCH=CHCOOHx)$_2$; dibutyltin di(benzylmaleate) of the formula Bu$_2$Sn(OCOCH=CHCOOBz)$_2$; and dibutyltin di(octylphthalate) of the formula

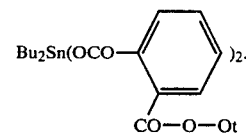

The room temperature-curable silicone rubber composition of the present invention can be prepared by uniformly blending the above described components (a) to (d) although the component (c) is an optional component admixed according to need. In view of the limited pot life of the composition containing all of the components, the commercial supply of the composition generally may be composed of two packages of which one contains a blend of the components (a) and (c) and the other contains a blend of the components (b) and (d) and the contents of these two packages are blended together directly before use.

The blending proportion of these components is also limited to certain ranges. Taking 100 parts by weight of the component (a) as the base, the amount of the component (b) should be in the range from 1 to 30 parts by weight since deficiency in the amount of the component (b) may result in incomplete curing of the composition or unduly long time required for complete curing while an excessively large amount of the component (b) is disadvantageous due to the inconveniently short pot life of the composition as well as due to the brittleness of the cured rubbery elastomer of the composition.

The amount of the component (c), when used, should be 300 parts by weight or smaller per 100 parts by weight of the component (a) since a composition loaded with an excessively large amount of an inorganic filler may lose flowability to cause some inconvenience in working therewith and the cured rubbery elastomer of the composition also suffers brittleness. Although siliceous fillers are preferred in general from the standpoint of the curability of the composition and the mechanical properties of the cured rubbery elastomer thereof, it is preferable in order to improve the heat resistance of the cured rubbery elastomer that the component (c) partially comprises iron oxide in an amount of at least 5 parts by weight per 100 parts by weight of the component (a) although the amount of the iron oxide filler should be limited not to exceed a half of the total amount of the component (c) because an excessively large amount of an iron oxide filler is detrimental to the curability of the composition and the mechanical strength of the cured rubbery elastomer.

The component (d) is a curing catalyst of the composition so that deficiency in the amount of this component in the composition naturally results in an unduly long time required for curing to cause industrial impracticability of the composition while a composition admixed with an excessively large amount of the component (d) cures so rapidly that no adequate pot life of the composition can be obtained to cause a great difficulty in the practical application thereof. In this regard, the amount of the component (d) should be in the range from 0.01 to 5% by weight or, preferably, from 0.05 to 2.0% based on the total amount of the components (a), (b) and (c). It should be noted, however, that the specific organotin compound represented by the general formula (I) or (II) is so highly active that the amount of such an organotin compound as a curing catalyst should preferably be relatively small. The preferable amount of these specific organotin compounds as the curing catalyst is in the range from 0.03 to 0.4% by weight or, preferably, from 0.05 to 0.2% by weight based on the total amount of the components (a), (b) and (c).

In addition to the above described components (a) to (d), the inventive room temperature-curable silicone rubber composition may further be admixed with various kinds of additives which may be conventional in like compositions optionally admixed according to need. For example, the pot life of the inventive composition may be somewhat extended by the addition of a diorganopolysiloxane of a lower molecular weight terminated at both molecular chain ends each with a hydroxy group directly bonded to the silicon atom. Further, a silicone fluid of which the terminal groups of the diorganopolysiloxane structure are trihydrocarbylsilyl, e.g. trimethylsilyl, groups can be added to the composition when mold-releasability is desired of the composition. The composition may be admixed even with water in a small amount in an object to control the curing behavior of the composition, especially, in the depth of a thick layer. Other conventional additives need not be described in any further detail.

In the following, Examples of the inventive and comparative experiments are given in order to more clearly illustrate the inventive room temperature-curable silicone rubber compositions, in which "parts" in each occurrence refers to "parts by weight".

In the Tables given below, the organotin compounds are indicated by the respective numbers as below.
I: Bis(methoxymaleoyloxy dibutyltin) oxide
II: Bis(ethoxymaleoyloxy dibutyltin) oxide
III: Bis(isopropoxymaleoyloxy dibutyltin) oxide
IV: Dibutyltin di(hexylmaleate)
V: Dibutyltin di(benzylmaleate)
VI: Dibutyltin di(octylphthalate)
VII: Dibutyltin dibenzoate
VIII: Dibutyltin dioleate
IX: Dibutyltin dilaurate
X: Dibutyltin dioctoate

EXAMPLE 1 (EXPERIMENTS NO. 1 TO NO. 10)

Room temperature-curable silicone rubber compositions were prepared each by uniformly blending 100 parts of a dimethylpolysiloxane terminated at both molecular chain ends each with a dimethylhydroxysilyl group and having a viscosity of 1500 centistokes at 25° C., 9 parts of phenyl triethoxysilane, 0.1 part of water and 0.2 part of one of the organotin compounds indicated in Table 1 which also shows the pot life of the composition, curing behavior of the composition when the composition was poured into a metal mold and kept standing for 24 hours or 96 hours and the permanent compression set of the cured rubbery elastomer of the composition.

In the Table, the curing behavior of the composition is given by three ratings of A, B and C, of which the criteria are as follows.
A. Good curing as a rubbery elastomer
B: Somewhat incomplete curing
C: Apparently poor curing not to be rubbery Further, the values of the permanent compression set were obtained according to the procedure specified in JIS K 6301 undertaken at 180° C. for 22 hours of compression.

As is clear from the results shown in Table 1, each of the room temperature-curable silicone rubber compositions had an adequately long pot life but the curing behavior thereof was quite satisfactory to be completely cured already after 24 hours. The permanent compression set of the cured rubbery elastomer was remarkably small in the range of 20 to 30% when the catalyst was the organotin compound of the formula (I) or (II).

TABLE 1

| Expt. No. | Organotin compound No. | Parts by weight | Pot life, minutes | Curing After 24 hours | Curing After 96 hours | Permanent compression set, % |
|---|---|---|---|---|---|---|
| 1 | I | 0.2 | 40 | A | A | 25 |
| 2 | II | 0.2 | 40 | A | A | 27 |
| 3 | III | 0.2 | 50 | A | A | 22 |
| 4 | IV | 0.2 | 40 | A | A | 22 |
| 5 | V | 0.2 | 40 | A | A | 20 |
| 6 | VI | 0.2 | 50 | A | A | 22 |
| 7 | VII | 0.2 | 120 | B | A | 45 |
| 8 | VIII | 0.2 | 120 | B | A | 50 |
| 9 | IX | 0.2 | >300 | C | A | 65 |
| 10 | X | 0.2 | >300 | C | A | 70 |
| 11 | I | 0.3 | 30 | A | A | 40 |
| 12 | VII | 0.5 | 50 | A | A | 90 |
| 13 | IX | 0.6 | 60 | A | A | 100 |
| 14 |  | 0.05 | 60 | A | A | 22 |
| 15 |  | 0.10 | 50 | A | A | 30 |
| 16 |  | 0.20 | 35 | A | A | 55 |
| 17 |  | 0.01 | 120 | C | B-A | 90 |
| 18 |  | 0.60 | 15 | A | A | 100 |
| 27 | V | 0.1 | 40 | A | A | 8 |
| 28 | IX | 0.1 | >200 | C | B-A | 65 |
| 29 | IX | 0.5 | 40 | A | A | 95 |

EXAMPLE 2 (EXPERIMENTS NO. 11 TO NO. 13)

The formulation of the composition in Experiment No. 11 was the same as in Experiment No. 1 except that the amount of bis(methoxymaleoyloxy dibutyltin) oxide was increased to 0.3 part. Further, the formulations of the compositions in Experiments No. 12 and No. 13 were the same as in Experiments No. 7 and No. 9, respectively, except that the amount of the respective organotin compound was increased to 0.5 part or 0.6 part, respectively. The pot life and the curing behavior of each composition and the permanent compression set of the cured rubbery elastomer of each composition are shown in Table 1.

EXAMPLE 3 (EXPERIMENTS NO. 14 TO NO. 18)

Room temperature-curable silicone rubber compositions were prepared each by uniformly blending 100 parts of a dimethylpolysiloxane terminated at both molecular chain ends each with hydroxydimethylsilyl group and having a viscosity of 5000 centistokes at 25° C., 5 parts of Ethyl Polysilicate 40 (a tradename by Union Carbide Corp.), 3.3 parts of a dimethylpolysiloxane terminated at both molecular chain ends each with a hydroxydimethylsilyl group and having a viscosity of 20 centistokes at 25° C. and a varied amount of bis(methoxymaleoyloxy dibutyltin) oxide in the range from 0.01 to 0.60 part. The pot life and the curing behavior of each of the compositions and the permanent compression set of the cured rubbery elastomer of each composition are shown in Table 1.

As is clear from the results shown in Table 1, quite satisfactory results were obtained when the amount of the organotin compound as the curing catalyst was in the range of 0.05 to 0.20 part in respect of the permanent compression set.

EXAMPLE 4 (EXPERIMENTS NO. 19 TO NO. 26)

Room temperature-curable silicone rubber compositions were prepared each by uniformly blending 100 parts of the same dimethylpolysiloxane as used in Experiment No. 1, 7.0 parts of tetraethoxysilane, 50 parts of one of the inorganic fillers indicated in Table 2 and dibutyltin di(benzylmaleate) in an amount of 0.1% by weight based on the total amount of the other three components. Table 2 below gives the value of pH of the aqueous suspension of the inorganic filler in each composition, the pot life and curing behavior of each composition and the permanent compression set of the cured rubbery elastomer of each composition.

When the inorganic filler was excessively acidic or excessively alkaline, the curing of the composition was remarkably retarded and the cured rubbery elastomer of the composition exhibited a large value of the permanent compression set.

TABLE 2

| Expt. No. | Inorganic filler Type | pH | Pot life, minutes | Curing After 24 hours | Curing After 96 hours | Permanent compression set, % |
|---|---|---|---|---|---|---|
| 19 | Iron oxide | 4.5 | 60 | A | A | 25 |
| 20 | Iron oxide | 5.5 | 60 | A | A | 13 |
| 21 | Quartz powder | 7.0 | 50 | A | A | 10 |
| 22 | Diatomaceous earth | 8.0 | 50 | A | A | 15 |
| 23 | Precipitated silica | 9.5 | 60 | A | A | 38 |
| 24 | Fumed silica | 2.0 | 120 | B | A | 85 |
| 25 | Precipitated silica | 11.0 | 80 | B | A | 80 |
| 26 | Diatomaceous earth | 11.0 | 70 | B | A | 80 |

EXAMPLE 5 (EXPERIMENTS NO. 27 TO NO. 29)

A room temperature-curable silicone rubber composition was prepared by uniformly blending 100 parts of the same dimethylpolysiloxane as used in Experiment No. 1, 17 parts of phenyl triethoxysilane, 200 parts of the same powdered quartz as used in Experiment No. 13, 3 parts of a fumed silica filler, of which the aqueous suspension had a pH of 6.0, 20 parts of a dimethylpolysiloxane terminated at both molecular chain ends each with a trimethylsilyl group and having a viscosity of 1000 centistokes at 25° C., 7 parts of a dimethylpolysiloxane terminated at both molecular chain ends each with a hydroxydimethylsilyl group and having a viscosity of 15 centistokes at 25° C. and dibutyltin di(benzylmaleate) in an amount of 0.1% by weight of the total amount of the above named six components (Experiment No. 27) or, in place of the dibutyltin di(benzylmaleate), dibutyltin dilaurate in amounts of 0.1 and 0.5% by weight of the total amount of the above named six components (Experiments No. 28 and No. 29, respectively).

The pot life and the curing behavior of each of the compositions and the permanent compression set of the cured rubbery elastomer of each composition are shown in Table 1.

EXAMPLE 6 (EXPERIMENTS NO. 30 TO NO. 32)

Room temperature-curable silicone rubber compositions were prepared each by uniformly blending 100 parts of the same dimethylpolysiloxane as used in Experiment No. 1, 7 parts of methyl trimethoxysilane, 100 parts of the same powdered quartz as used in Experiment No. 29, 15 parts of a dimethylsilicone fluid terminated at both molecular chain ends each with a trimethylsilyl group and having a viscosity of 25 centistokes at 25° C. and an organotin compound which was 0.05% by weight (Experiment No. 30) or 0.01% by weight (Experiment No. 31) of dibutyltin di(benzylmaleate) or 0.5% by weight of dibutyltin dilaurate (Experiment No. 32), each based on the total amount of the components other than the organotin compound.

The compositions in Experiments No. 30 and No. 32, which had good pot life, could be cured satisfactorily after 24 hours of standing at room temperature but curing of the composition of Experiment No. 31 was incomplete even after 96 hours. The permanent compression set of the cured rubbery elastomers of these two compositions was determined after complete curing under varied conditions for the measurement at a temperature in the range from 100° to 200° C. and the time for compression up to 250 hours. The results for the compositions in Experiments No. 30 and No. 32 are shown in Table 3.

TABLE 3

| Expt. No. | After compression for, hours | Permanent compression set, %, at 100° C. | 150° C. | 180° C. | 200° C. |
|---|---|---|---|---|---|
| 30 | 22 | 3 | 3 | 5 | 5 |
|  | 72 | 5 | 8 | 8 | 10 |
|  | 250 | 8 | 15 | 18 | 25 |
| 32 | 22 | 20 | 40 | 75 | 100 |
|  | 72 | 45 | 65 | 100 | 100 |
|  | 250 | 60 | 100 | 100 | 100 |

EXAMPLE 7 (EXPERIMENTS NO. 33 TO NO. 38)

Room temperature-curable silicone rubber compositions were prepared each by uniformly blending 100 parts of a mixture of two hydroxy-terminated dimethylpolysiloxanes composed of a first hydroxy-terminated dimethylpolysiloxane (referred to as Base Fluid I) having a viscosity of 8000 centistokes at 25° C. and a second hydroxy-terminated dimethylpolysiloxane (referred to as Base Fluid II) containing 0.13 mole/100 g of vinyl groups in partial replacement of the methyl groups and having a viscosity of 700 centistokes at 25° C. in a varied proportion as indicated in Table 4 below, 3 parts of Polysilicate 40 (a product by Union Carbide Corp.), 80 parts of a powder of crystalline quartz, 3 parts of a finely divided precipitated silica filler and 0.3 part of dibutyltin dioctoate.

Each of the thus prepared compositions was poured into a metal mold and kept standing for 144 hours at room temperature to be cured therein into a cured rubbery elastomer body of which the hardness was determined either as cured or after heating at 260° C. for 1 day or 7 days to give the results shown in Table 4. The numerical values in brackets are each the difference between the values of the hardness of the cured rubber before and after heating at 260° C.

TABLE 4

|  | Experiment No. | | | | | |
|---|---|---|---|---|---|---|
|  | 33 | 34 | 35 | 36 | 37 | 38 |
| Formulation |  |  |  |  |  |  |
| Base Fluid I, parts | 100 | 90 | 60 | 40 | 20 | 0 |
| Base Fluid II, parts | 0 | 10 | 40 | 60 | 80 | 100 |
| Content of | 0 | 0.013 | 0.052 | 0.078 | 0.104 | 0.130 |

TABLE 4-continued

| | Experiment No. | | | | | |
|---|---|---|---|---|---|---|
| | 33 | 34 | 35 | 36 | 37 | 38 |
| vinyl groups, moles/100 g | | | | | | |
| Hardness | | | | | | |
| As cured | 65 | 65 | 65 | 65 | 65 | 65 |
| After 1 day at 260° C. | 45 (−20) | 50 (−15) | 58 (−7) | 65 (0) | 75 (+10) | 90 (+25) |
| After 7 days at 260° C. | 50 (+5) | 53 (+3) | 68 (+10) | 75 (+10) | 85 (+10) | 95 (+5) |

EXAMPLE 8 (EXPERIMENTS NO. 39 TO NO. 44)

Room temperature-curable silicone rubber compositions were prepared each by uniformly blending 100 parts of a hydroxy-terminated dimethylpolysiloxane containing 0.04 mole/100 g of vinyl groups in partial replacement of the methyl groups and having a viscosity of 500 centistokes at 25° C., 3 parts of Polysilicate 40, 0.3 part of dibutyltin di(benzylmaleate) and 2 or 3 kinds of the inorganic fillers including a diatomaceous earth, a finely divided precipitated silica filler and an iron oxide each in an amount indicated in Table 5.

Each of the thus prepared compositions was poured into a metal mold and kept standing for 72 hours at room temperature to be cured therein into a cured rubbery elastomer body of which the hardness was determined either as cured or after heating at 260° C. for 1 day or 7 days to give the results shown in Table 5. The numerical values in brackets are each the difference between the values of the hardness of the cured rubber before and after heating at 260° C.

TABLE 5

| | Experiment No. | | | | |
|---|---|---|---|---|---|
| | 39 | 40 | 41 | 42 | 43 |
| Inorganic filler, parts | | | | | |
| Diatomaceous earth | 100 | 95 | 80 | 50 | — |
| Precipitated silica | 3 | 3 | 3 | 3 | 3 |
| Iron oxide | — | 5 | 20 | 50 | 100 |
| Hardness | | | | | |
| As cured | 68 | 68 | 65 | 60 | 40 |
| After 1 day at 260° C. | 57 (−11) | 57 (−11) | 57 (−8) | 52 (−8) | 45 (+5) |
| After 7 days at 260° C. | 72 (+15) | 67 (+10) | 62 (+5) | 57 (+5) | 50 (+5) |

EXAMPLE 9 (EXPERIMENTS NO. 44 AND NO. 45)

A red polysiloxane paste having a viscosity of 290 poise at 25° C. was prepared by uniformly blending 80 parts of a hydroxy-terminated dimethylpolysiloxane having a viscosity of 8000 centistokes at 25° C., 20 parts of a hydroxy-terminated dimethylpolysiloxane containing 0.13 mole/100 g of vinyl groups in partial replacement of the methyl groups and having a viscosity of 1000 centistokes at 25° C., 1.5 parts of a liquid organopolysiloxane resin composed of $(CH_3)_3SiO_{\frac{1}{2}}$ units and $SiO_2$ units, 3.0 parts of a finely divided precipitated silica filler, 70 parts of a powdered quartz and 15 parts of an iron oxide to give a mixture, which was agitated for 2 hours at 150° C. followed by cooling and further addition of 2.0 parts of a hydroxy-terminated dimethylpolysiloxane having a viscosity of 10 centistokes at 25° C.

The thus prepared red polysiloxane paste was admixed in a weight ratio of 100:2 with a clear catalyst liquid composed of 90% by weight of Polysilicate 40 and 10% by weight of dibutyltin dilaurate to give a room temperature-curable silicone rubber composition (Experiment No. 44) which was poured into a 500 ml glass beaker in a depth of 50 mm and kept standing for 7 days at room temperature to be cured into a rubbery elastomer. This cured rubbery elastomer was subjected to the measurement of the hardness either as cured or after heating at 260° C. for 7 days to give the results shown in Table 6 which also includes the value of the hardness at the intermediate curing stage by standing for 24 hours at room temperature. No change was noted in the appearance of the cured rubbery elastomer by the heating at 260° C. for 7 days.

The above prepared composition was subjected to the test of adhesiveness according to the procedure specified in MIL-S-25043 using test panels of corrosion-resistant steel. Table 6 gives the values of the adhesive strength determined either as bonded or after heating at 260° C. for 7 days.

For comparison, a comparative composition (Experiment No. 45) was prepared with the same formulation as above except that the vinyl-containing hydroxy-terminated dimethylpolysiloxane was replaced with the same amount of the hydroxy-terminated dimethylpolysiloxane having a viscosity of 1000 centistokes at 25° C. containing no vinyl groups and the iron oxide filler was replaced with the same amount of the liquid organopolysiloxane resin. This comparative composition was subjected to the same test as above to give the results shown in Table 6. In the heating test at 260° C. for 7 days, blisters and cracks were found on the surface of the cured rubbery elastomer after heating.

TABLE 6

| | Experiment No. | |
|---|---|---|
| | 44 | 45 |
| Hardness | | |
| After 1 day curing | 55 | 56 |
| After 7 days curing | 66 | 66 |
| After 7 days at 260° C. | 66 | 45 |
| Adhesive bonding strength kg | | |
| As bonded | 5.5 | 5.8 |
| After 7 days at 260° C. | 6.3 | 2.5 |

What is claimed is:
1. A room temperature-curable silicone rubber composition which comprises:
(a) 100 parts by weight of a diorganopolysiloxane of a substantially linear molecular structure terminated at both molecular chain ends each with a hydroxy group directly bonded to the silicon atom and having a viscosity in the range from 500 to 1,000,000 centistokes at 25° C.;
(b) from 1 to 30 parts by weight of an organosilicon compound having at least three alkoxy groups directly bonded to the silicon atom or atoms;
(c) up to 300 parts by weight of an inorganic filler having a surface property not excessively acidic or alkaline; and
(d) an organotin compound represented by the general formula

$R_2R^1Sn-O-SnR^1R_2$ or $R_2SnR^1_2$, in which R is a monovalent hydrocarbon group and $R^1$ is an acid residue of a monoalkyl ester of a dibasic carboxylic acid, in an amount from 0.01 to 5% by weight based on the total amount of the components (a), (b), and (c).

2. The room temperature-curable silicone rubber composition as claimed in claim 1 wherein the organotin compound as the component (d) is selected from the class consisting of bis(methoxymaleoyloxy dibutyltin) oxide, bis(ethoxymaleoyloxy dibutyltin) oxide, bis(isopropoxymaleoyloxy dibutyltin) oxide, dibutyltin di(hexylmaleate), dibutyltin di(benzylmaleate) and dibutyltin di(octylphthalate).

3. The room temperature-curable silicone rubber composition as claimed in claim 1 wherein the inorganic filler as the component (c) has such a surface property that the aqueous suspension thereof has a value of pH in the range from 3 to 10.

4. The room temperature-curable silicone rubber composition as claimed in claim 1 wherein the organosilicon compound as the component (b) is selected from the class consisting of methyl trimethoxysilane, methyl triethoxysilane, phenyl trimethoxysilane, phenyl triethoxysilane, vinyl trimethoxysilane, vinyl triethoxysilane, tetraethoxysilane, tetrapropoxysilane and a partial hydrolysis-condensation product thereof.

5. The room temperature-curable silicone rubber composition as claimed in claim 1 wherein the diorganopolysiloxane as the component (a) contains from 0.01 to 0.1 mole of vinyl groups bonded to the silicon atoms per 100 g of the component, the balance of the organic groups in the component being methyl groups.

* * * * *